United States Patent [19]

Stone

[11] 4,380,787
[45] Apr. 19, 1983

[54] CLAMP FOR BOUNCE-FLASH APPARATUS

[76] Inventor: Kenneth Stone, P.O. Box G, Boulder Creek, Calif. 95006

[21] Appl. No.: 303,861

[22] Filed: Sep. 21, 1981

[51] Int. Cl.³ .............................................. G03B 15/02
[52] U.S. Cl. .......................................... 362/16; 362/8; 362/17; 362/18; 362/307; 362/396; 362/433
[58] Field of Search .................. 362/8, 396, 433, 307, 362/16, 17, 18

[56] References Cited

U.S. PATENT DOCUMENTS

| | | | |
|---|---|---|---|
| 3,763,366 | 10/1973 | Bahnsen | 362/16 |
| 4,106,077 | 8/1978 | Furda | 362/8 |
| 4,109,301 | 8/1978 | Wakimura | 362/16 |
| 4,272,169 | 6/1981 | Stone | 362/18 |

*Primary Examiner*—Stephen J. Lechert, Jr.

[57] ABSTRACT

A clamp for a flash gun is provided which can be slipped on and off the gun and which has a slot therein whereby a bounce-flash reflector can be retained in said slot. In accordance with one embodiment of the invention, a second, opposed slot is provided so that one slot is adapted to retain a reflector and the opposite slot is adapted to retain a diffuser.

3 Claims, 5 Drawing Figures

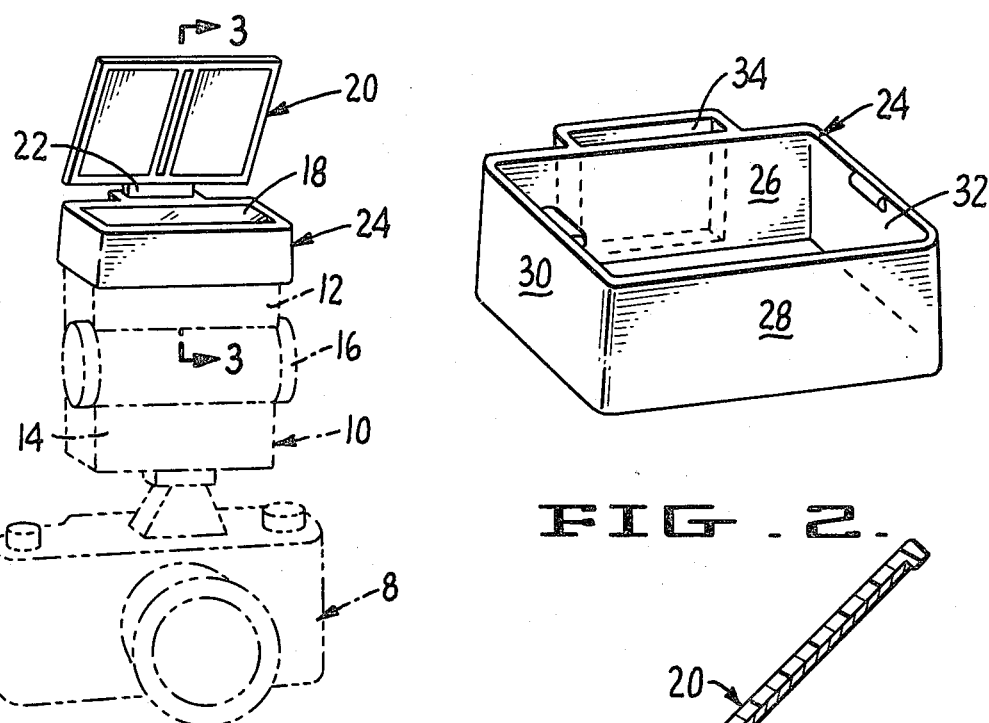
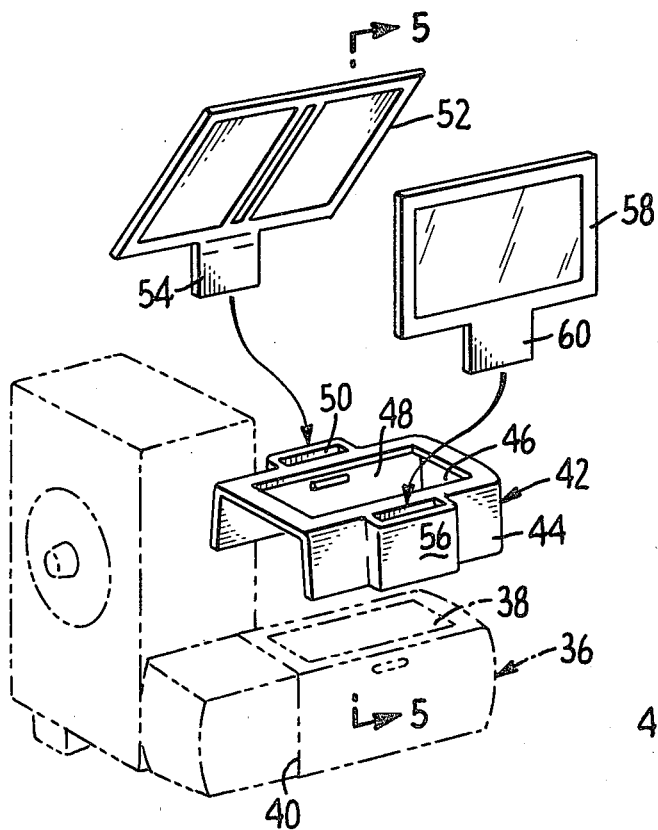
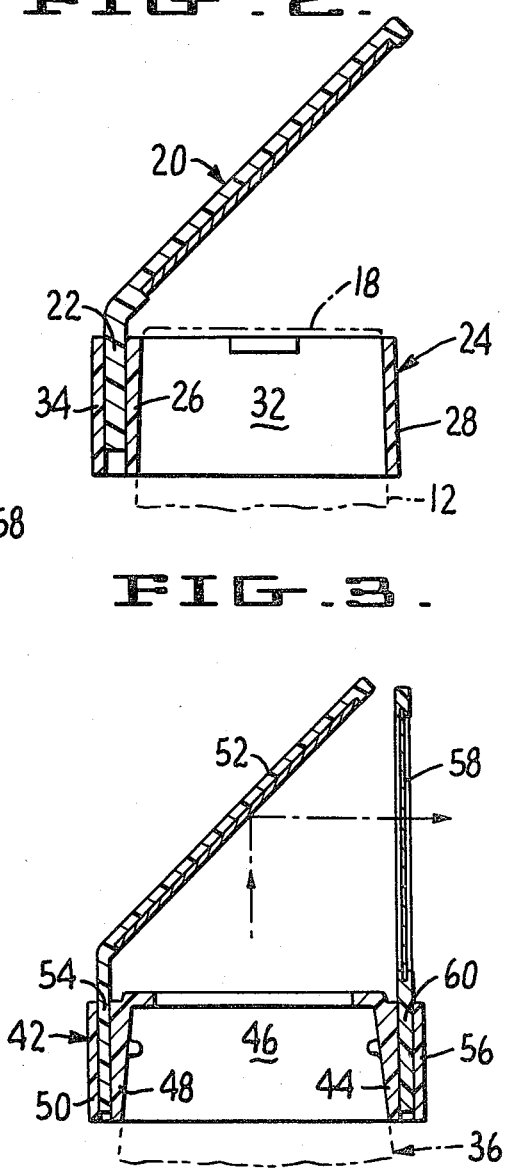
FIG.1.
FIG.2.
FIG.3.
FIG.4.
FIG.5.

CLAMP FOR BOUNCE-FLASH APPARATUS

SUMMARY OF THE INVENTION

The present invention relates to apparatus suitable for use with the bounce-flash reflector of my prior U.S. Pat. No. 4,272,169. Said patent represented a substantial improvement over the prior art but it did require that a small bracket be permanently attached to the flash gun. This had a disadvantage that one could not readily utilize the reflector without first permanently attaching the bracket to the flash gun. Thus if one had several flash guns, it was necessary to attach a bracket to each separate gun. Further, many users lacked the necessary manual dexterity to perform even the simple steps of cementing the bracket to the gun.

A further deficiency of the prior device was that provision was made for only holding a single article, namely a reflector, on the flash gun. In accordance with the present invention, opposed slots can be provided on a bracket whereby it is possible to not only attach a reflector for bounce-flash but also, utilizing the opposite bracket, hold a diffuser if extremely soft effects are desired.

Thus, the present invention provides a clamp which can be merely slipped over the end of the flash gun so that it does not require any manual dexterity for attaching it. Further, the clamp is releasably gripped by the flash gun and is held in place merely by friction so it is easy to change from one gun to another. Additionally, and in accordance with a preferred embodiment of the invention, a second, opposed slot is provided so that more than one device can be retained on the flash gun, namely a reflector and a diffuser.

Other features and advantages of the invention will be brought out in the balance of the specification.

BRIEF DESCRIPTION OF THE DRAWINGS

FIG. 1 is a perspective view of a clamp embodying the present invention showing it in place on a flash gun and a camera wherein the flash gun and camera are shown in phantom.

FIG. 2 is an enlarged, exploded, perspective view of one embodiment of the clamp.

FIG. 3 is an enlarged section on the line 3—3 of FIG. 1.

FIG. 4 is an exploded perspective view of another embodiment of the invention wherein a diffuser is employed and also illustrating an embodiment wherein the clamp member does not completely surround the end of the flash gun.

FIG. 5 is an enlarged section on the line 5—5 of FIG. 4.

DESCRIPTION OF THE PREFERRED EMBODIMENTS

Referring now to the drawings by reference characters there is shown a camera designated 8 with a flash gun 10 mounted thereon. The flash gun is of the folding type having a flash unit proper 12 connected to a body 14 by means of hinge 16. Body 14 is attached to the camera in the usual manner. The flash is emitted from the surface 18 and it will be seen that the end of the flash gun which is designated 12 has a generally rectangular configuration. As is shown in FIG. 1, light emitting surface 18 does not face toward the subject as for a direct flash but is shown in a bent up position so that the light is emitted at an angle to the subject for the bounce-flash.

The bounce-flash reflector unit is generally designated 20 and is not described in detail since it is fully described in my prior U.S. Pat. No. 4,272,169. However, it will be seen that reflector 20 has a downwardly extending tongue 22 for attaching the reflector to a flash unit.

In this embodiment of the invention, the flash is held in place by means of a clamp which forms the crux of the present invention. This clamp has been generally designated 24 and has opposed sides 26 and 28 and opposed ends 30 and 32. The walls 26, 28, 30 and 32 are tapered inwardly slightly so that as the device is pressed down on the end 12 of a flash gun, the clamp will engage the end of the flash gun by friction and will be releasably retained thereon.

Formed on the wall 26 is a slot member 34 and, as can be seen in FIG. 1, the tongue 22 is adapted to slip into the slot. Thus, in accordance with this embodiment of the invention, one can slip the clamp 24 over the flash gun where it will be engaged by friction and thus held on the end of the flash gun while the light emitting surface 18 free of obstruction. Now the flash gun can be used either in the normal position with the light emitting surface aimed toward the subject or, in the bounce-flash position as is shown in FIG. 1, wherein the light emitting surface 18 faces upwardly. Now one can insert the reflector 20 into the slot 34 where it will be retained for as long as desired. Thus, the clamp of the present invention permits one to attach or detach either the clamp in its entirety or just the reflector at will.

Referring now to FIG. 4, another embodiment of the invention is shown for use with a flash gun where the entire end of the flash gun is not exposed. In this embodiment of the invention the flash gun 36 has a light emitting surface 38 but it is attached to the body of the flash gun one side so that the side 40 is not exposed so that it is not possible to employ a clamp completely surrounding the flash gun. Thus the clamp generally designated 42 has a front wall 44, a side wall 46 and a back wall 48. The back wall 48 contains a slot 50 so that the reflector 52 having tongue 54 can be inserted and used as previously described. However, in this embodiment of the invention, another feature is shown wherein the front wall 44 also carries a slot 56. In this embodiment of the invention, a diffuser screen 58 may be employed having a downwardly extending tongue 60. Thus, in this embodiment of the invention, one can employ not only the reflector 52 but also the diffuser 58.

Naturally in some embodiments of the invention, not illustrated, the clamp of FIG. 2, having four sides, might carry a second slot or, conversely, a clamp such as that shown in FIG. 4 might carry only a single slot for retaining the reflector.

Although certain specific embodiments of the invention have been illustrated, it will be understood that many variations can be made without departing from the spirit of this invention.

I claim:

1. A clamp and reflector combination for a bounce-flash unit wherein a flash gun is employed having a generally rectangular end surrounding a light emitting surface, comprising in combination:
    (a) a band at least partially surrounding said rectangular end in releasably gripping relationship,
    (b) said band carrying at least one slot member, and (c) a reflector having a tongue whereby said tongue can be placed in said slot and retained in a fixed relationship with said light emitting surface.

2. The structure of claim 1 wherein said band completely encircles the end of the flash gun.

3. The structure of claim 1 having slots on opposite sides of said band whereby a reflector can be placed in one of said slots and a diffuser in the opposite slot.

* * * * *